(No Model.) 2 Sheets—Sheet 1.
F. SIEBERT.
PULLEY.
No. 319,140. Patented June 2, 1885.
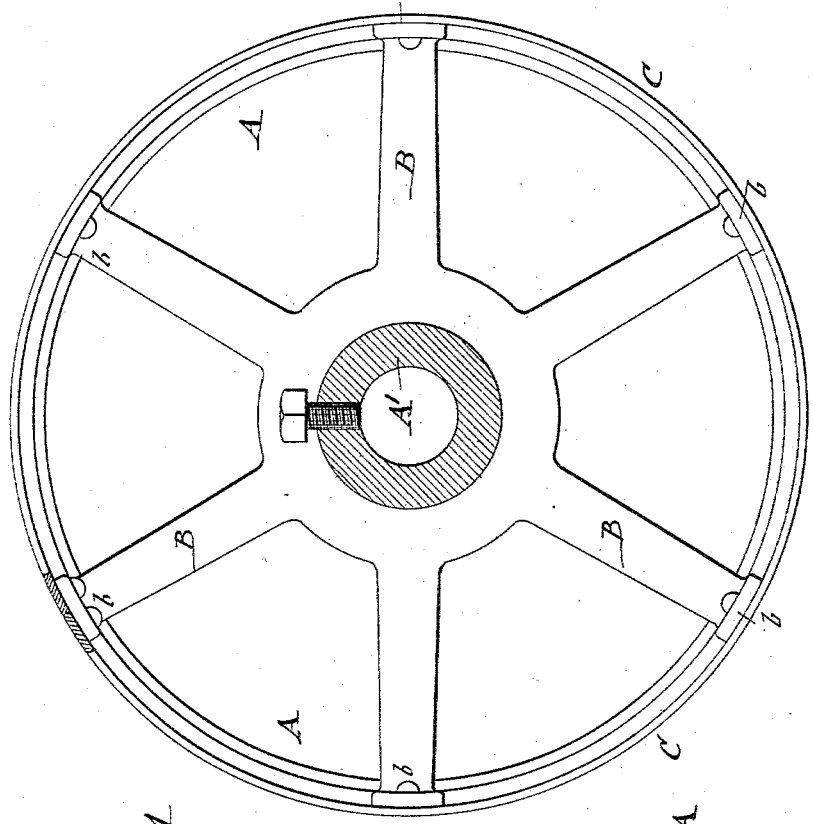
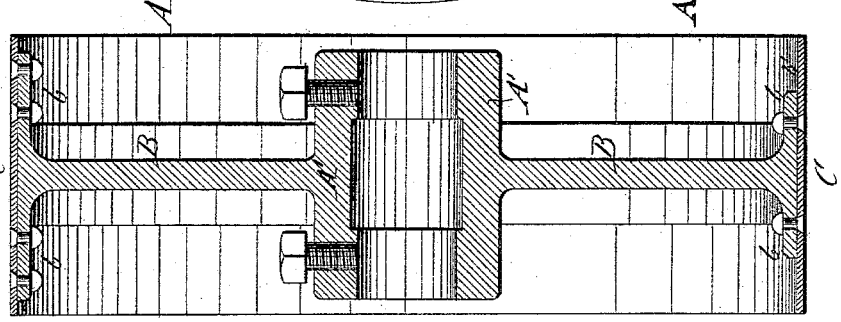
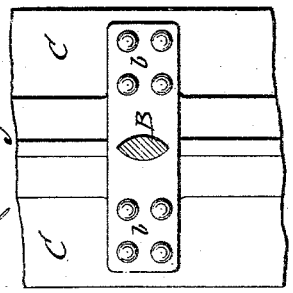 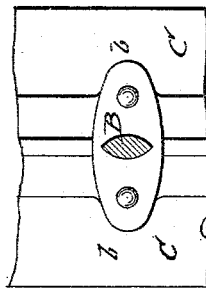
WITNESSES:
A. Schehl.
Ernst Wolff
INVENTOR
Frederick Siebert
BY Goepel & Raegener
ATTORNEYS (No Model.) 2 Sheets—Sheet 2.
F. SIEBERT.
PULLEY.
No. 319,140. Patented June 2, 1885.
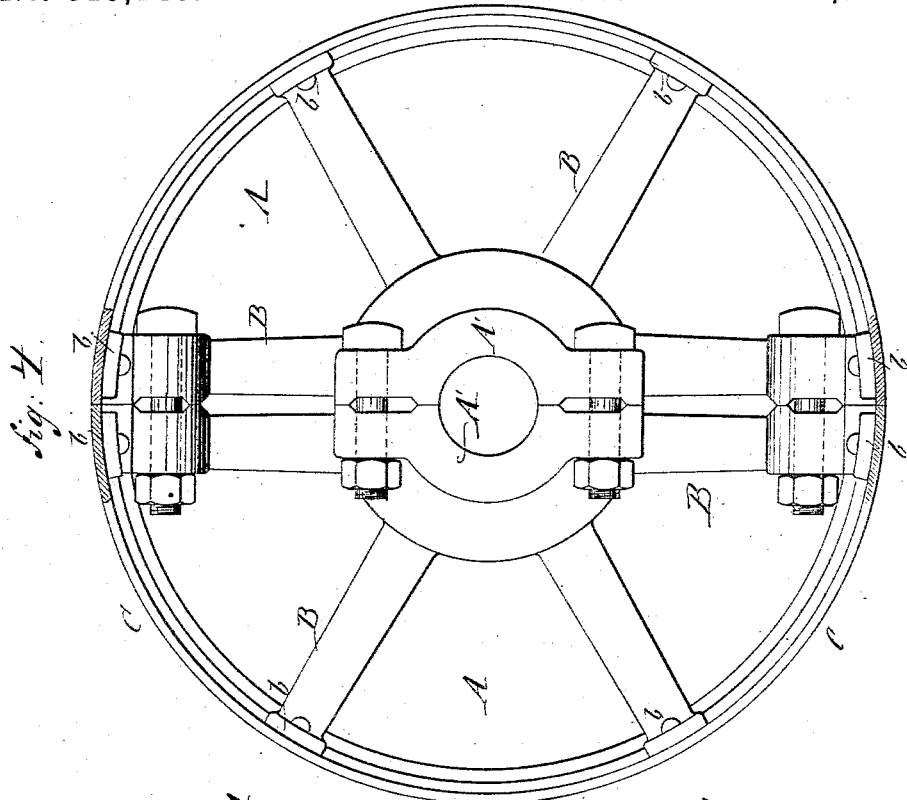
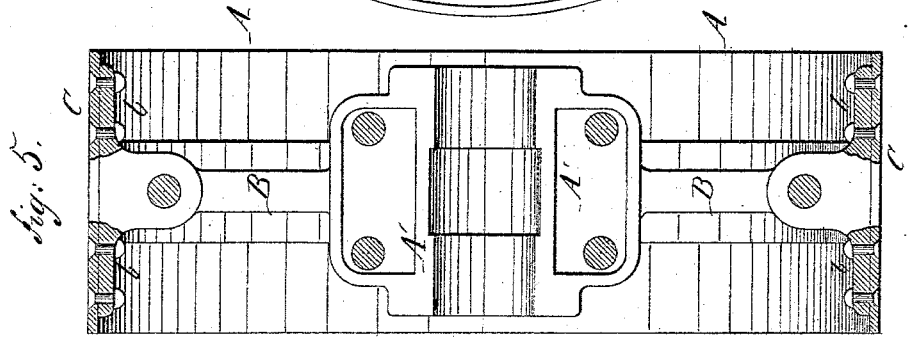
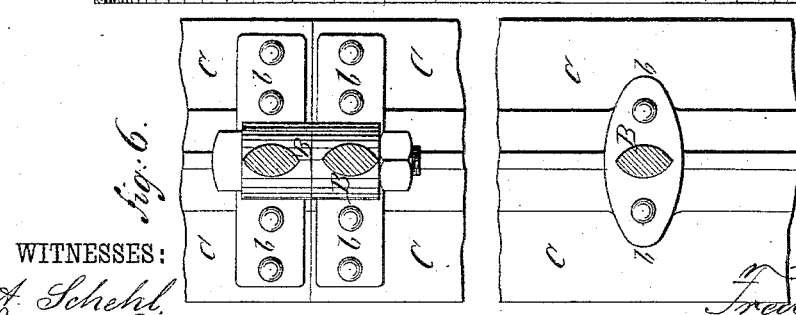
WITNESSES:
A. Schehl
Martin Petry
INVENTOR
Frederick Siebert
BY
Goepel & Raegener
ATTORNEYS.

UNITED STATES PATENT OFFICE.

FREDERICK SIEBERT, OF ST. LOUIS, MISSOURI.

PULLEY.

SPECIFICATION forming part of Letters Patent No. 319,140, dated June 2, 1885.

Application filed December 12, 1884. (No model.)

*To all whom it may concern:*

Be it known that I, FREDERICK SIEBERT, of the city of St. Louis, in the county of St. Louis, and State of Missouri, have invented certain new and useful Improvements in Pulleys, of which the following is a specification.

This invention relates to an improved pulley which is more durable than the common cast-iron pulleys, and which is better taken hold of by the belt; and the invention consists of a pulley the hub, arms, and rim of which are made of cast-iron and provided with a wider rim of wrought-iron that is attached by countersunk rivets to the enlarged heads of the arms.

In the accompanying drawings, Figure 1 represents a side elevation of my improved pulley, partly in section; Fig. 2, a vertical transverse section of the same. Fig. 3 shows detail bottom views of the connection of the enlarged heads of the arms with the wrought-iron rim. Fig. 4 is a sectional side elevation of a split pulley made according to my invention. Fig. 5 is a vertical transverse section of the split pulley, and Fig. 6 shows detail bottom views of the connection of the arms with the wrought-iron rim of the split pulley.

Similar letters of reference indicate corresponding parts.

A in the drawings represents a pulley the hub A' and radial arms B B of which are made of cast-iron, and provided at the outer ends with laterally-extending heads $b$, that are connected by a rim, $b'$, cast in one piece with the hub and arms and of less width than the heads $b$. The outer surface of the cast-iron rim $b'$ is turned off true and smooth, and a wrought-iron rim, C, fitted to the same. The wrought-iron rim C is connected with the cast-iron rim $b'$ and the heads $b$ by boring through the rims C and $b'$ and the enlarged heads $b$ of the arms B B and riveting the rim C to the heads $b$ in such a manner that the rivets are flush with the outer surface of the rim C. The wrought-iron rim C is then turned off on the lathe and polished. In this manner any cast-iron pulley can be changed into a pulley with wrought-iron rim of a greater width, which is hugged by the belt in a better manner.

The wrought-iron rim may be used for fixed or loose pulleys, and also for split pulleys, as shown in Figs. 4, 5, and 6, in which case the frame as well as the wrought-iron rim of the pulley is made of two sections, which are connected by transverse bolts in the usual manner.

Having thus described my invention, I claim as new and desire to secure by Letters Patent—

1. The combination of a cast-iron pulley-frame having arms with laterally-extending ends or heads, and a rim cast in one p ece therewith, with a wrought-iron rim attached to the enlarged heads of the arms, substantially as set forth.

2. The combination of a cast-iron pulley-frame having arms with laterally-extending ends or heads, and a cast-iron rim with a wrought-iron rim of greater width than said heads, the wrought-iron rim being attached by countersunk rivets to the heads of the arms, substantially as set forth.

In testimony that I claim the foregoing as my invention I have signed my name in presence of two subscribing witnesses.

FREDERICK SIEBERT.

Witnesses:
 HENRY HIEMENZ, Jr.,
 WM. A. TANNER.